United States Patent Office 3,726,809
Patented Apr. 10, 1973

3,726,809
CATALYST SUPPORTS AND TRANSITION METAL CATALYSTS SUPPORTED THEREON
Keith George Allum, Bracknell, Samuel McKenzie, Richmond, and Robert Chalmers Pitkethly, Camberley, England, assignors to The British Petroleum Company Limited, London, England
No Drawing. Filed Dec. 14, 1970, Ser. No. 98,031
Claims priority, application Great Britain, Dec. 19, 1969, 61,920/69
Int. Cl. C07f 7/02
U.S. Cl. 252—431 P     5 Claims

ABSTRACT OF THE DISCLOSURE

Catalyst supports are prepared by reacting an inorganic solid material (I) containing —OH groups e.g. silica with a compound (II) containing silicon and phosphorus e.g. $(EtO)_3SiCH_2CH_2PEt_2$. The product can be reacted with transition metal compounds e.g. Group VIII metal compounds to yield heterogeneous catalysts. In an alternative preparation the transition metal compound can be reacted with compound (II) and the product then reacted with the compound (I).

---

The present invention relates to novel catalyst supports containing phosphorus, to novel catalysts having metal atoms bonded to the phosphorus of such supports and to the use of the novel catalysts.

The use of phosphine complexes of transition metals as homogeneous catalysts for a variety of reactions such as carboxylation, hydrogenation and oligomerisation of olefins is known. The catalysts often contain valuable metals, for example, palladium and iridium, and catalyst recovery and recycle is therefore of great importance. However, it is often a problem to achieve a high degree of catalyst recovery.

It has now been found that inorganic solid materials containing —OH groups can be reacted with compounds containing phosphorus to yield materials suitable for use as catalyst supports and that such catalysts can be used as the heterogeneous analogues of the homogeneous catalysts mentioned above.

Thus according to one aspect of the present invention there is provided a catalyst support material containing groups of the formula:

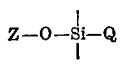     (I)

where Z is a residue obtained by removing an —OH group from a solid inorganic material containing —OH groups and Q is a group containing trivalent phosphorus.

The catalyst support material may be of the formula $$[Z\text{—}O\text{—}Si(X)_{2-m}(R^{111})_m\text{—}R^{11}\text{—}]_nPR_{3-n} \quad (2)$$

or $$Z\text{—}O\text{—}Si(X)_{(3-m-n)}(R^{111})_m(R^{11}PR_2)_n \quad (3)$$

where Z is as defined above, X is halogen, pseudohalogen, alkoxy containing up to 10 carbon atoms, aryloxy containing up to 10 carbon atoms, carboxyl, —OH, —NH$_2$, —NHR, —NR$_2$ or —OSi(OR)$_3$ or —O—Z, the X radicals being the same or different, where R and R$^{111}$ are the same or different and are selected from hydrogen or monovalent hydrocarbon radicals containing up to 20 carbon atoms, R$^{11}$ is a divalent hydrocarbon radical containing up to 20 carbon atoms and $n$ is 1, 2 or 3, $m$ is 0, 1 or 2 and $m+n \leqslant 3$.

Preferred catalyst supports materials are those containing units of formula:

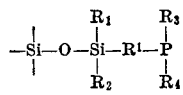

where R$_1$, R$_2$, R$_3$ and R$_4$ are aryl or alkyl group containing up to 10 carbon atoms and where either or both of R$_1$ and R$_2$ can be an alkoxy or aryloxy containing up to 10 C and where —R$^1$— is a divalent organic radical containing up to 20 carbon atoms.

According to another aspect of the present invention there is provided a process for the preparation of catalyst support materials of the above Formula I which process comprises reacting a compound containing a group of formula:

where X is a functional group capable of reacting with an —OH group to form an —O—Si— bond and Q is as defined above with an inorganic solid material containing —OH groups at a temperature in the range 0 to 500° C.

The compound containing groups of Formula A may have the formula:

$$[(X)_{(3-m)}Si(R^{111})_m(\text{—}R^{11}\text{—})]_nPR_{3-n} \quad (B)$$

or $$[(X)_{(4-m-n)}Si(R^{111})_m][\text{—}R^{11}\text{—}PR_2]_n \quad (C)$$

where $m$, $n$, X, R, R$^{11}$ and R$^{111}$ are as defined above.

Particularly suitable compounds of Formula A are those having the formula:

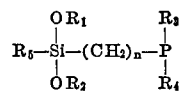

where R$_1$, R$_2$, R$_3$, R$_4$ and R$_5$ are aryl or alkyl groups containing up to 10 carbon atoms are where R$_5$ can also be an alkoxy or aryloxy group containing up to 10 C and $n$ is an integer from 1 to 6. Preferably R$_1$, R$_2$ and R$_3$ are lower alkyl groups e.g. methyl, ethyl or propyl and R$_3$ and R$_4$ are preferably phenyl groups.

Suitable hydroxyl group-containing solid materials are molecular sieves of the alumino silicate type, alumina, silica-alumina, titania, active carbon and silica.

The preferred material is silica, more preferably silica gel.

The inorganic solid material containing —OH groups should have an adequate accessible surface area, preferably >1 m.$^2$/g. The accessibility of the surface will depend on the pore size distribution of the support and size of compound (A). It is therefore preferable to use a support with a relatively large surface area and a large average pore diameter e.g. >15 A.

The surface hydroxyl concentration will depond on factors such as the nature of the support and prior heat treatment used. Silica-gel usually contains less than seven surface silanol groups per 100 A.$^2$, but at least 1 surface silanol group per sq. meter.

In a typical case the reaction may be represented as follows:

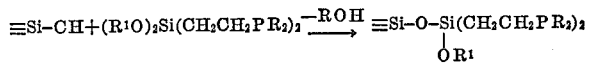

or alternatively two OR$^1$ groups may be replaced to yield

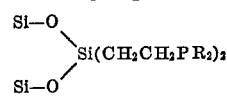

The quantity of compound (A) reacted with the support will depend on (i) the available surface area (ii) the concentration of surface hydroxyl groups, (iii) the M.W. of (A) and (iv) the concentration of surface phosphine groups desired. Generally the quantity of compound A used is not critical.

The reaction may be effected at temperatures in the range 0 to 500° C. preferably 10 to 250° C.

The reaction may be carried out in a number of ways:

(a) Compound (A) may be dissolved in a solvent e.g. benzene, toluene or xylene and contacted with the support material. When an alcohol is formed as a reaction product, this may be azeotroped from the reaction mixture. Any unreacted phosphine can readily be removed from the surface by washing in a Soxhlet apparatus.

(b) If compound (A) is liquid or will melt, then no solvent need be used.

(c) If compound (A) is sufficiently volatile, the support material may be treated with the vapour of compound (A).

Trivalent phosphorus groups may also be introduced onto the surface of the supports by impregnating the support with the compound containing groups of Formula A and then hydrolysing the product. Compound containing groups (A) may be dissolved in a volatile solvent, contacted with the support and the volatile solvent removed to yield a surface layer of compound (A) on the solid. The surface layer may then be hydrolysed by the addition of water, a wet solvent a water vapour. No volatile solvent need be used if compound (A) is a liquid or melts. The reaction may be effected at 0 to 500° C., preferably 10–250° C.

Alternatively the trivalent phosphorus groups may be synthesized onto the inorganic support by first reacting the support with a silicon compound containing either a Si—H bond or olefinically unsaturated group respectively and then reacting with a phosphorus compound:

$$Z-OH + (RO)_3SiCH=CH_2 \longrightarrow Z-O-\underset{|}{\overset{|}{Si}}-CH=CH_2$$

$$\downarrow R_2PH$$

$$Z-O-\underset{|}{\overset{|}{Si}}-(CH_2)_2PR_2$$

or $$Z-OH + (RO)_3SiH \longrightarrow Z-O-\underset{|}{\overset{|}{Si}}-H$$

$$\downarrow R_2PCH_2CH=CH_2$$

$$Z-O-\underset{|}{\overset{|}{Si}}-(CH_2)_3PR_2$$

The reaction may be effected at temperatures in the range 0 to 500° C. preferably 10 to 450° C.

Alternatively, for example, the compound of Formula A may be impregnated directly onto wet silica. In a further alternative process the silica for the reaction may be formed in situ by hydrolysis of a compound of formula $Si(OR)_4$ where the R groups are the same or different are monovalent hydrocarbon radicals containing from 1 to 20 carbon atoms. In this case the $Si(OR)_4$ compound may be hydrolysed in the presence of the compound of Formula A. Suitable compound of formula $Si(OR)_4$ are the tetraakly orthosilicates, for example, tetraethyl orthosilicate.

Suitable compounds of Formula A are those of formula:

$$(R'O)_2Si[(C_2)_nPR_2]_2 \text{ and } (R^1O)_3Si[(CH_2)_nPR_2] \text{ and }$$

$$(R^1O)_3Si(CH_2)_n-\hspace{-2pt}\langle\hspace{-2pt}\rangle\hspace{-2pt}-PR_2$$

where $n$ is an integer from 1 to 20 and R and $R^1$ are hydrogen or an alkyl or aryl containing up to 20 C e.g. methyl, ethyl, propyl, butyl, or phenyl or paramethoxyphenyl.

The radicals R and $R^1$ may each be the same or different. For example, the following compounds may be used:

$[(C_2H_5)_2P(CH_2)_3]_2Si(OC_2H_5)_2$ described in German Pats. Nos. 1,113,827 and 1,118,788;

$(C_2H_5)_2P(CH_2)_2Si(OC_2H_5)_3$ described in German Pat. 1,118,781;

$(C_6H_5)(C_2H_5)P(CH_2)_3Si(OC_2H_5)_3$ described in United States Pat. 3,607,227 and United States Pat. 2,995,594;

$(C_6H_5)(C_2H_5)P(CH_2)_2Si(OC_2H_5)_3$ described in United States Pat. 2,995,594;

$(C_6H_5)(C_4H_9)P(CH_2)_2Si(OC_2H_5)_3$ described in United States Pat. 3,067,229;

$(C_2H_5)_2P(CH_2)_2Si(CH_3)Cl_2$ described in German Pat. 1,113,827;

$(C_6H_5)(H)P(CH_2)_2Si(OC_2H_5)_3$ described in United States Pat. 3,067,299;

$(C_6H_5)_2P(CH_2)_2Si(CH_3)(OC_2H_5)_2$ described in United States Pat. 3,067,299;

$(C_6H_5)_2P(CH_2)_2Si(CH_3)Cl_2$ described in British Pat. 1,007,333;

$(C_6H_5)_2P(CH_2)_2SiCl_3$ described in British Pat. 1,007,333;

$(C_6H_5)_2P(CH_2)_2Si(CH_3)Cl$ described in British Pat. 1,007,333;

$(C_6H_5)P[(CH_2)_2Si(CH_3)_2Cl]_2$ described in French Pat. 1,340,233;

$(EtO)_3Si(CH_2)_2\, P\, Ph_2$;

$$(EtO)_3Si(CH_2)_2P\left(-\hspace{-2pt}\langle\hspace{-2pt}\rangle\hspace{-2pt}-X\right)_2$$

where X is an alkoxy group $$(EtO)_3Si\left[(CH_2)_n-\hspace{-2pt}\langle\hspace{-2pt}\rangle\hspace{-2pt}-PPh_2\right]$$

where $n$ is 1 to 6 and $$(EtO)_3Si\left[(CH_2)_n-\hspace{-2pt}\langle\hspace{-2pt}\rangle\hspace{-2pt}-P\left(-\hspace{-2pt}\langle\hspace{-2pt}\rangle\hspace{-2pt}-OMe\right)_2\right]$$

Also suitable as compounds of Formula A are:

$$Cl_2Si(C_2H_5)CH_2CH_2P(C_2H_5)_2$$
$$Cl_2Si(CH_2CH_2P(C_2H_5)_2)_2$$

and $$(C_2H_5O)_3SiCH_2CH_2P(C_6H_5)_2$$

which may be prepared by the methods described in "Progress in Inorganic Chemistry," L. Maier, Interscience, 1967, 5, 27.

Compounds of formula:

$$PhP\left[(CH_2)_n-\underset{\underset{R^1}{|}}{\overset{\overset{R^1}{|}}{Si}}-Cl\right]_2$$

are also suitable.

Preferred compounds are those of Formula A where X is—$OR^1$ and $R^1$ is as defined above, for example:

$$(R^1O)_3Si(CH_2)_nPR_2 \text{ and } (R^1O)_2Si((CH_2)_nPR_2)_2 \text{ and}$$

$$(R^1O)_3Si\left((CH_2)_n-\hspace{-2pt}\langle\bigcirc\rangle\hspace{-2pt}-PR_2\right)$$

where $R^1$ is methyl, ethyl, propyl or butyl, $n$ is 2 or 3 and R is phenyl, ethyl, hexyl, or $$-\hspace{-2pt}\langle\bigcirc\rangle\hspace{-2pt}-OMe$$

Generally the compound of Formula A is prepared by the addition of a phosphine containing a —P—H bond to an unsaturated silicon compound e.g.:

$$R_2PH + CH_2=CHSiX_3 \rightarrow R_2P(CH_2)_2SiX_3$$

or by the addition of a silicon compound containing an Si—H bond to an olefinically unsaturated phosphine e.g.

$$P_2PCH=CH_2 + HSiX_3 \rightarrow R_2P(CH_2)_3SiX_3$$

According to another aspect of the present invention there is provided a transition metal-containing catalyst material comprising a support material containing groups of Formula I as hereinbefore defined, in which at least some of the phosphorus atoms are bonded to transition metal atoms.

The transition metal is preferably a Group VI, VII, or VIII metal e.g. nickel, cobalt, rhenium, molybdenum, tungsten, ruthenium, iron, iridium, palladium or platinum. A preferred metal is rhodium, nickel cobalt or palladium.

According to another aspect of the present invention a process for the preparation of supported transition metal catalysts comprises reacting a support of Formula I with a transition metal compound under conditions such that the transition metal becomes bonded to the phosphorus atoms.

The reaction may be effected at temperatures in the range —80 to 250° C. The reaction can often be effected by warming the transition metal compound and the phosphorus containing support in a suitable inert solvent for the transition metal compound. In some cases it will be desirable to perform the reaction at room temperature or below. Saturated or aromatic hydrocarbons, halogenated hydrocarbons, alcohols, ethers or mixtures thereof may be used as solvent. Heating will usually be carried on for ½ to 6 hours, but the reaction time may be longer or shorter in specific instances.

The conditions used for a particular reaction between the support (I) and the transition metal compound will be determined by the nature of the particular reaction being carried out. For example, the reaction between bis(cyclo-octadiene) nickel and a silica-based phosphine must be carried out at below 30° C. whereas other reactions such as that between rhenium carbonyl and a silica based phosphine, may require considerably higher temperatures. The quantity of transition metal compound used will be determined by the phosphorus content of support (I), the phosphine/metal ratio in the required complex and the nature of the reaction (e.g. in certain cases excess phosphine is required for the reaction). Often the phosphine/metal ratio is not critical and unreacted metal compound can usually be easily removed.

In the formation of the metal-containing phosphine compound it often occurs that one of the following reactions takes place:

(a) The transition metal compound contains a displaceable ligand such as carbonyl, olefin, diolefin, phosphine or a solvent molecule e.g. tetrahydrofuran, and the ligand is diplaced under the reaction conditions whilst the transition metal atom chelates with the phosphorous e.g.

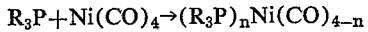
$R_3P + Ni(CO)_4 \rightarrow (R_3P)_nNi(CO)_{4-n}$ where $n = 1$ or $2$.

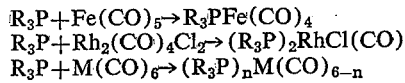
$R_3P + Fe(CO)_5 \rightarrow R_3PFe(CO)_4$
$R_3P + Rh_2(CO)_4Cl_2 \rightarrow (R_3P)_2RhCl(CO)$
$R_3P + M(CO)_6 \rightarrow (R_3P)_nM(CO)_{6-n}$ where $M = Cr$, Mo or W, $n = 1$ or $2$.

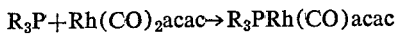
$R_3P + Rh(CO)_2acac \rightarrow R_3PRh(CO)acac$ where acac is acetylacetonate.

The reaction can sometime be carried out by (i) phosphine exchange e.g.

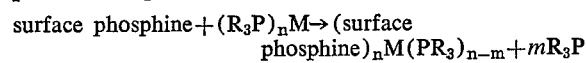
surface phosphine + $(R_3P)_nM \rightarrow$ (surface phosphine)$_n$M(PR_3)$_{n-m}$ + $mR_3P$ or (ii) using a volatile transition metal compound, e.g. Ni(CO)_4 Fe(CO)_5 or bis ($\pi$ allyl) nickel in the vapour phase.

(b) The transition metal is capable of increasing its co-ordination number under the reaction conditions and thereby permits the chelate to be formed, e.g.

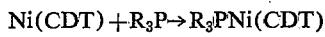
Ni(CDT) + $R_3P \rightarrow R_3PNi(CDT)$ where CDT is 1,5,9 cyclododecatriene,

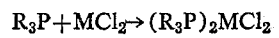
$R_3P + MCl_2 \rightarrow (R_3P)_2MCl_2$ where M is divalent nickel, palladium, platinum or cobalt,

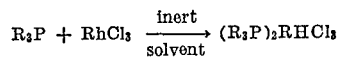
$R_3P + RhCl_3 \xrightarrow[\text{solvent}]{\text{inert}} (R_3P)_2RhCl_3$ (c) The reaction takes place in the presence of a solvent which enters into the reaction, e.g. $C_2H_5OH$ admixed with KOH which introduces a CO group as in

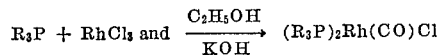
$R_3P + RhCl_3$ and $\xrightarrow[\text{KOH}]{C_2H_5OH} (R_3P)_2Rh(CO)Cl$ or

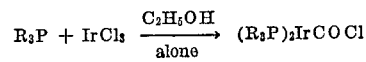
$R_3P + IrCl_3 \xrightarrow[\text{alone}]{C_2H_5OH} (R_3P)_2IrCOCl$ or

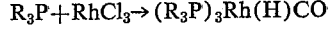
$R_3P + RhCl_3 \rightarrow (R_3P)_3Rh(H)CO$ effected with HCHO in ethanol followed by NaBH_4 in ethanol.

In the above formula at least one of the R groups will be attached to the base material while the others may be alkyl or aryl. In an alternative embodiment of the present invention the transition metal compound may be contacted with the silicon and phosphorus containing compound of Formula A in a first stage to form a co-ordination complex which may then be reacted with the inorganic solid containing —OH groups in a second stage.

The compound of Formula I having transition atoms bonded to the phosphorus atoms can be prepared by first reacting the compound containing silica and phosphorus with a transition metal compound and then reacting this reaction product with silica or other —OH group containing material.

In the process where the transition metal compound is first contacted with the compound of Formula A the reaction may in a typical case be represented thus:

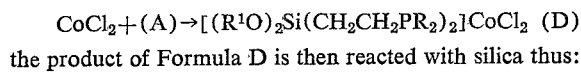
$CoCl_2 + (A) \rightarrow [(R^1O)_2Si(CH_2CH_2PR_2)_2]CoCl_2$ (D)

the product of Formula D is then reacted with silica thus:

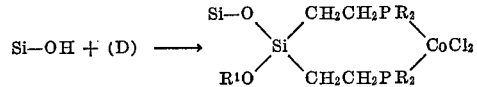

Suitable conditions for the first stage reaction are: temperatures from —80° C. to 250° C., molar ratios of 0.1 to 50 and preferably in solution. Suitable solvents will depend on the particular reaction being carried out. In certain cases inert solvents will be used (e.g. hydrocarbons) whereas in others the solvent may take part in the reaction (e.g. ethanol).

Water should be excluded from the reaction to prevent hydrolysis of the Si—X groups.

For the second stage the complex is preferably dissolved in a solvent (e.g. benzene, toluene, xylene etc.) although this may not be essential if the complex is a liquid or melts, suitable temperatures are from 0 to 400° C. preferably 10 to 250° C. Often the reaction can be effected by refluxing in benzene, toluene or xylene.

Many of the compositions of this invention are active as catalysts and are similar to such homogeneous phosphine-containing complexes as IrH_3(Ph_3P)_3 or

IrH_2(OOCCH_3)(Ph_3P)_3 for the hydrogenation of aldehydes or PdCl_2(Bu_3P_2) for the carboxylation of olefins.

A co-catalyst such as an aluminium alkyl, aluminum alkyl halide or aluminum trihalide or sodium borohydride may be necessary to render the phosphine containing complex active.

A number of catalyst systems consist of a mixture of transition metal compound, a phosphone and a reducing agent, such as an aluminum alkyl. Examples are:

M(acac)_n + Ph_3P + Et_2Al(OEt) for the dimerisation of butadiene where M is Fe (III), Co (III) or Ni (II), $n$ is 2 or 3 and acac is acetylacetonate.

Ni(acac)$_2$+R$_3$P+Et$_3$Al$_2$Cl$_3$ for propylene oligomerisation and (RCOO)$_2$Ni+Ph$_3$P+R$_2$AlCl for propylene dimerisation. The active species in these cases is formed in situ.

The phosphine compounds in this case may be replaced by phosphine-containing support, forming the active species on the surfaces of the support and providing a catalyst which utilises a composition according to the present invention.

The products of the present invention can, in some cases be used as heterogeneous catalysts which can either be separated from the reaction products in the case of a slurry process or used in a fixed bed process.

The supported transition metal catalysts according to the present invention may be used for the hydroformylation of olefins in a manner similar to that described in corresponding U.S. application Ser. No. 32,776, filed Apr. 28, 1970.

The catalysts according to the present invention can be used for the isomerisation of olefins particularly alpha olefins to internal olefins.

Thus according to the present invention a process for the isomerisation of olefins comprises contacting the olefin with a catalyst comprising a support of Formula I the phosphorus atoms of which have transition metal atoms bonded thereto under conditions such that isomerisation to yield a molecule with the double bond in a different position takes place. Preferred conditions for isomerisation are temperatures in the range —20° C. to 250° C. pressures in the range 1 atm. to 2,000 p.s.i.g. and space velocities in the range 0.1 to 10$^4$ v./v./hour.

Preferred feedstocks are simple mono-olefins and mixtures thereof e.g. butene-1 or butene-2, pentene-1, pentene-2 and the hexenes.

The catalysts according to the present invention can also be used for the polymerisation e.g. the oligomerisation of conjugated dienes e.g. butadiene to form cyclo-octadiene.

Suitable conditions for the polymerisation of dienes are 0 to 200° C. preferably 50 to 100° C. and a pressure of 1 atmosphere to 2000 p.s.i.g.

The catalysts according to the present invention can also be used for the acetoxylation of olefins e.g. ethylene to vinyl acetate.

Suitable conditions are 10 to 250° C. preferably 20 to 200° C. and pressures from 1 atmosphere to 2000 p.s.i.g.

Suitable feeds are ethylene, propylene, butenes and the like. Preferred feed is ethylene.

Suitable molar ratios of olefin:acetic acid are in the range 1:0.1 to 1:10 and olefin:air of 1:0.1 to 1:10.

The catalyst according to the present invention can also be used for the polymerisation e.g. oligomerisation, and cyclo-oligomerisation of acetylenes e.g. in a manner similar to that described in U.S. Pat. 3,658,884, issued Apr. 25, 1972.

Thus, according to the present invention there is provided a process for the polymerisation of acetylenically unsaturated monomers which process comprises polymerising the monomer in the presence of a catalyst comprising a support of Formula I the phosphorus atoms of which have transition metal atoms bonded thereto.

The polymerisation is suitably carried out at a pressure between 0 to 400 p.s.i.g., although subatmospheric pressures can be used preferably the pressures are from 0 to 200 p.s.i.g. It has been found generally convenient to carry out the reaction at atmospheric pressure, although this is not critical.

Preferably the temperature is between 0° C. and 100° C., more preferably 80 to 100° C.

Preferably the acetylenically unsaturated compounds have from 2 to 10 carbon atoms per molecule e.g. acetylene, methyl acetylene of phenyl acetylene or isopropenylacetylene. Substituted acetylenic compounds such as ethyl propiolate may also be used. The reaction may produce linear or substantially linear polymeric products but normally cyclic oligomers will be formed.

The nature of the product i.e. whether it is mainly cyclic or linear depends on the particular acetylene being polymerised, e.g. cyclic products tend to be formed by monosubstituted acetylenes selected from the lower alkyl, aryl, vinyl hydroxymethyl, alkoxycarbonyl, acyl and alkoxy acetylenes. Linear products tend to be formed by the less reactive monosubstituted acetylenes e.g. those substituted by higher alkyl cyclohexyl and hydroxyl alkyl.

Normally an inert or reducing atmosphere should be present.

The compounds of Formula I according to the present invention besides being employed to support transition metals may also be used to separate transition metals from solution e.g. in a manner similar to that described in our U.K. patent application No. 41,506/69 and corresponding to U.S. Ser. No. 81,574, filed Oct. 16, 1970.

Thus according to the present invention there is provided a process for the separation of transition metal ions or compounds from solution which process comprises contacting a solution of the metal ions or compounds to be separated with a solid material of Formula I.

The invention is illustrated by the following examples.

EXAMPLE 1

The preparation of silica containing trivalent phosphorus

Preparation of (C$_2$H$_5$O)$_3$SiCH$_2$CH$_2$P(C$_6$H$_5$)$_2$ (P).—Triethoxy vinyl silane (69.6 g., 0.36 mol) was added under nitrogen to stirred diphenyl phosphine (80.4 g., 0.42 mol) dropwise over 30 minutes. The mixture was then irradiated with a high intensity ultra-violet lamp for 70 hours. The reaction product was distilled and the fraction distilling at 155°–165° C. and 0.1 mm. Hg collected (127 g., yield 85 percent).

Silica (ex. J. Crosfield U40 grade) was washed with dilute acid and then with distilled water in a Soxhlet apparatus and dried for four hours at 180° C.

(a) 4 g. of silica was treated with 8 g. of compound (P) in 120 ml. refluxing xylene for six hours under nitrogen. Ethanol was azeotroped from the reaction mixture. The silica was subsequently washed with toluene in a Soxhlet apparatus for six hours under nitrogen and dried under vacuum.

Phosphorus content=1.4 percent weight (b) The above reaction was repeated using 8 g. of silica and 15.6 g. of (I).

Phosphorus content=1.3 percent weight (c) The reaction was repeated using 60 g. of silica and 60 g. of (I) for eight hours.

Phosphorus content=1.0 percent weight

EXAMPLE 2

The Synthesis of metal complexes on to silica containing phosphine groups (A) Nickel.—(a) 0.5 g. of product from Example 1(a) (containing 1.4 percent weight phosphorus) were treated with 0.73 g. of NiCl$_2$6H$_2$O dissolved in 15 mls. of hot ethanol. The reaction mixture was briefly refluxed, and the product subsequently washed with hot ethanol and dried under vacuum. A dark red product results.

Nickel content=0.5 percent weight (b) The reaction was repeated using 2 g. of product from Example 1(b) (containing 1 percent weight phosphorus) and 1.46 g. of NiCl$_2$6H$_2$O.

Nickel content=0.4 percent weight (B) Cobalt.—(a) Reaction (A)(a) was repeated using the equivalent quantity of anhydrous cobalt (II) chloride in place of nickel chloride. A blue product results.

Cobalt content=0.6 percent weight (b) Reaction (A)(b) was repeated using the equivalent quantity of anhydrous cobalt (II) chloride in place of nickel chloride.

Cobalt content=0.7 percent weight (C) Rhodium.—(a) 1 g. of product from Example 1(b) (containing 1.3 percent weight phosphorus) was treated with 0.8 g. of $RhCl_3 3H_2O$ dissolved in 15 mls. of ethanol. The product was washed with ethanol and dried under vacuum. A red brown product results.

Rhodium content=1.7 percent weight (b) 1 g. of product from Example 1(b) (containing 1.3 percent weight phosphorus) was treated with 0.76 g. of $Rh_2(CO)_4Cl_2$ in 15 mls. of ethanol. Effervescence occurred. The reaction mixture was stirred at 60° C. for 15 minutes under nitrogen, and the product washed with ethanol and dried under vacuum. A yellow product results.

Rhodium content=2.1 percent weight (D) Palladium.—1 g. of product from Example 1(c) (containing 1 percent weight phosphorus) was treated with 0.1 g. of $PdCl_2$ in 15 mls. of water. The mixture was stirred for ten minutes and the product washed with water and methanol, and dried under vacuum. A yellow product results.

Palladium content=1.2 percent weight

EXAMPLE 3

(E) Hydroformylation of hexene-1.—A 1 litre rocking heptane (200 ml.) and catalyst (0.2 g.) prepared as described in part (C)(c) of Example 2 and heated at 80° C. for 3 hours under 600 p.s.i.g. of $CO/H_2$ (1:1). The bomb was repressurized to 600 p.s.i.g. at 1 hourly intervals. The autoclave was allowed to cool over the weekend.

Conversion _____ percent weight__ 100
Molar selectivity of $C_7$ aldehydes _____do____ 30
Normal: Branch ratio _____ 1.95

(70 percent of the olefin is isomerized to internal olefin.)

EXAMPLE 4

(a) Silica containing trivalent phosphorus was prepared as previously described in Example 1 from acid washed ID Silica Grade 113 (ex. WR Grace Ltd.) and $(C_2H_5O)_3SiCH_2CH_2P(C_6H_5)_2$. The phosphorus content of the product was 0.9% wt.

(b) 5.9 gms. of the product prepared as described in (a) above was reacted with 1.0 gms. of rhenium carbonyl in 120 mls. refluxing xylene under nitrogen for 62 hours. The product was washed with xylene and then in a Soxhlet apparatus with pentane for 8 hours. The product was then dried. The rhenium content was 4.4% wt.

(c) 4.24 gms. of the Re/P-$SiO_2$ prepared as described in (b) above were transferred to a glass microreactor under nitrogen and butene-1 passed over the material at 15 ml./hour at 1 atmosphere. Isomerisation of butene-1 was recorded at temperatures from 130 to 240° C.

|  | Analysis of products | | |
|---|---|---|---|
|  | butene-1 | trans butene-2 | cis butene-2 |
| Temperature (° C.): | | | |
| 130 | 71 | 20 | 9 |
| 215 | 50 | 30 | 20 |
| 240 | 47 | 31 | 22 |

EXAMPLE 5

(I) Preparation of transition metal compounds.—All operations were carried out under dry, $O_2$ free nitrogen using dry, degassed solvents.

(a) Preparation of $(RhCl(CO)((EtO)_3SiCH_2CH_2P\emptyset_2)_2)$ (I).—2.487 g. (6.4 mM.) or rhodium dicarbonyl chloride were dissolved in 100 ml. benzene in a flask and 9.599 g. (25.5 mM.) of (2-diphenyl phosphino ethyl) triethoxyl silane $(EtO)_3SiCH_2CH_2P\emptyset_2)$ dissolved in 50 ml. benzene added under nitrogen at room temperature. Carbon monoxide is evolved and the solution changes from red to yellow. The reaction mixture was stirred for 15 minutes with nitrogen passing through the solution and then stood overnight. The benzene was evaporated to small bulk and the product precipitated with pentane. The resulting yellow crystals were filtered off, washed with pentane and sucked dry.

| | Analyses | |
|---|---|---|
| | Calculated | Found |
| Rh | 11.19 | 11.11 |
| C | 53.56 | 53.68, 53.89 |
| H | 6.36 | 6.57, 6.39 |
| P | 6.74 | 7.12, 7.13 |
| Cl | 3.86 | 3.55, 3.71 |

$\nu (CO) = 1,966$ cm.$^{-1}$.

(b) Preparation of $(RhSBu^n(CO)((EtO)_3SiCH_2CH_2P\emptyset)_2)_2$ (II).—0.899 g. of $(Rh(CO)_2SBu^n)_2$ (prepared from $(Rh(CO)_2Cl)_2$ and $n$BuSH and 50 ml. of degassed pentane were placed in a flask and 4 g. of $(EtO)_3SiCH_2CH_2P\emptyset_2$ added under nitrogen. Carbon mono-oxide is evolved. The reaction mixture was stirred for two hours at room temperature. Attempts to precipitate the reaction product with methanol were unsuccessful. The reaction mixture was therefore evaporated to dryness and the product redissolved in pentane. The solution was cooled to −78° C. (a low melting solid is precipitated). The solution was allowed to warm to room temperature and the upper pentane layer discarded. The resulting red viscous liquid was reprecipitated from pentane in this manner three times and then dried in vacuo.

The infra-red spectrum shows a single CO stretching frequency at approximately 1950 cm.$^{-1}$ (the starting material shows five CO stretching frequencies of which the two major bands are at approximately 2000 cm.$^{-1}$ and 2050 cm.$^{-1}$).

(c) Preparation of $(RhH(CO)((EtO)_3SiCH_2CH_2P\emptyset_2)_3)$ (III).—5 g. of $(RhCl(CO)((EtO)_3SiCH_2CH_2P\emptyset_2)_2$ and 8.3 g. of $(EtO)_3SiCH_2CH_2P\emptyset_2$ were dissolved in 150 ml. of refluxing ethanol and 2 g. of sodium borohydride in 40 ml. ethanol slowly added to the refluxing solution under nitrogen. A precipitate is slowly formed. After 2–3 hours, the solid was filtered off and washed with ethanol. The solid was then recrystallized from benzene/pentane and benzene/ethanol to yield an orange-yellow solid.

The infra-red spectrum shows absorptions at 1970 cm.$^{-1}$ and 1900 cm.$^{-1}$ assignable to the CO and Rh-H stretching frequencies.

(d) Preparation of $(Co_2(CO)_6((EtO)_3SiCH_2CH_2P\emptyset_2)_2)$ (IV).—0.8 g. of freshly sublimed $Co_2(CO)_8$ were placed in a flask in 20 ml. degassed pentane and 1.9 g. of $(EtO)_3SiCH_2CH_2P\emptyset_2$ added under nitrogen. The reaction mixture was stirred at 0° C. for 2–3 hours and then stood in an ice-box for 66 hours. The pentane was removed in vacuo to yield viscous brown material.

Preparation of silica-supported complexes.—All experiments were carried out under oxygen-free nitrogen using dry, degassed solvents. The silica used through-out was J. Crosfield U40 grade which had been washed with dilute acid, Soxhlet-extracted with distilled water and then dried for four hours at 180° C.

(a) 5.5 g. of the complex

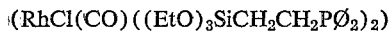
(RhCl(CO)((EtO)₃SiCH₂CH₂PØ₂)₂)

dissolved in 175 ml. of toluene were placed in a 250 ml. three-necked flasked under nitrogen. 20 g. of silica were then added and the reaction mixture refluxed with stirring for four hours. The ethanol was azeotroped from the reaction mixture by means of a Dean and Stark apparatus. An orange/red silica was formed. The resulting rhodium-containing silica was Soxhlet-extracted with toluene under toluene under nitrogen for 24 hours and dried in vacuo.

Rhodium content=0.9% wt.
Phosphorus content=0.6% wt.

(b) 2.5 g. of the complex (RhSBu(CO)((EtO)₃SiCH₂CH₂PØ₂)₂)

were dissolved in 170 ml. of benzene in a 250 ml. three-necked flask under nitrogen. 10 g. of silica were then added and the reaction mixture refluxed with stirring for four hours. The ethanol was azeotroped from the reaction mixture by means of a Dean and Stark apparatus. The resulting rhodium-containing silica was Soxhlet-extracted with benzene for 24 hours and then dried in vacuo.

Rhodium content=1.2% wt.

(c) 4.5 g. of the complex (RhH(CO)((EtO)₃SiCH₂CH₂PØ₂)₃)

were dissolved in 175 ml. of toluene in a 250 ml. three-necked flask under nitrogen. 20 g. of silica were then added and the reaction mixture refluxed with stirring for four hours. The ethanol was azeotroped from the reaction mixture by means of a Dean and Stark apparatus. A deep red silica was formed. The resulting rhodium-containing siilca was Soxhlet-extracted with toluene for 24 hours under nitrogen and then dried in vacuo.

Rhodium content=1.2% wt.
Phosphorus content=1.15% wt.

(d) 2.6 g. of the complex (Co₂(CO)₆((EtO)₃SiCH₂CH₂PØ₂)₂ were dissolved in 175 ml. of dry, degassed benzene under nitrogen in a 250 ml. three-necked flask. 10 g. of silica were then added and the reaction mixture refluxed with stirring for four hours. The ethanol was azeotroped from the reaction mixture by means of a Dean and Stark apparatus. The resulting cobalt-containing silica was Soxhlet-extracted with benzene for 24 hours under nitrogen and then dried in vacuo.

Cobalt content=1.6% wt.

A phosphorus-containing silica was prepared from 55 g. of acid-washed silica and 53.2 g. of (EtO)₃SiCH₂CH₂PØ₂ in 400 ml. of refluxing xylene over eight hours under nitrogen. The resulting silica was Soxhlet-extracted with toluene under nitrogen for eight hours and then dried in vacuo.

Phosphorus content=0.9% wt.

(a) 1 g. of bis(cyclo-octadiene iridium chloride)

(IrCl(COD))₂

(prepared from Na₂IrCl₆ and 1,5 cyclo-octadiene, was dissolved in 60 cc. of methylene chloride/heptane and refluxed with 5 g. of phosphorus-containing silica for several hours under nitrogen. The resulting iridium-containing silica was then Soxhlet-extracted with ethanol and then dried in vacuo.

Iridium content=3.9% wt.

(b) 3.9 g. of the iridium-containing silica, prepared in Example 6(a) above, were placed in a glass reactor packed between glass wool. Butene-1 (containing 7 percent weight butene-2) was then passed over the catalyst at a GHSV of approximately 200 and at a temperature of 80° C. The product temperature to 120° C., the butene-2 content of the product increased to 70 percent weight.

(c) 0.5 g. of an iridium-containing catalyst (prepared as described in (a) above) were stirred with 50 ml. of hexene-1 with hydrogen bubbling through the solution. The reaction mixture was refluxed for 10 hours.

Conversion of hexene-1=30% wt.
Selectivity to n-hexene=63% wt.

The product also contained hexene-2.

(d) 1.52 g. of an iridium-containing catalyst (prepared as described in (a) above) were placed in a glass reactor packed between glass wool and quartz chips. Isoprene was then pumped over the catalyst at LHSV=3 in the presence of hydrogen (GHSV≃500)

After 3 HOS at 50° C. the conversion of isoprene was 10 percent weight with a selectivity to methyl butenes of 88 percent weight.

EXAMPLE 7

2 g. of a rhodium-containing silica (prepared from rhodium trichloride in ethanol and phosphorus-containing silica as described in Example 2(C)(a) were placed in a glass micro-reactor. Butene-1 (containing 7 percent weight butene-2) was then passed over the catalyst at 75° C. and a

GHSV≃200

The product contained 78 percent weight butene-2.

EXAMPLE 8

0.46 g. of bis(cyclo-octadiene rhodium chloride).

(RhCl(COD))₂ were dissolved in methylene chloride and refluxed with 3.9 g. of phosphorus-containing silica for three hours under nitrogen. An orange rhodium-containing silica results. This material was then stirred in benzene under hydrogen for four hours. The product was finally Soxhlet-extracted with benzene for five hours and dried in vacuo.

Rhodium content=1% wt.

EXAMPLE 9

Catalyst for the acetoxylation of olefins (1) Catalyst preparation.—A phosphorus-containing silica was prepared from silica and (EtO)₃SiCH₂CH₂PØ₂ as described in Example 1.

0.67 g. of palladium chloride were dissolved in 100 ml. of hot water and the solution filtered and added to 15 g. of phosphorus-containing silica. The reaction mixture was stirred for one hour at 50° C. under nitrogen. The solution was then decanted off and the resulting yellow palladium-containing silica washed with water (5× 100 ml.) and methanol (5× 100 ml.). Finally the silica was Soxhlet-extracted with methanol for two hours and then dried in vacuo.

Palladium content=2.1% wt.
Chlorine content=1.3% wt.

(2) Catalyst testing.—15 ml. of the silica-supported palladium complex were placed in a reactor and examined for the acetoxylation of isobutene, propylene and ethylene. Reaction conditions and results obtained were as follows:

| HOS | Olefin feed | Feed rates (mol/l./h.) | | | Temperature (° C.) | Pressure, bar (ga.) | Space time yield of unsaturated acetate (mol/l./h.) |
| --- | --- | --- | --- | --- | --- | --- | --- |
| | | Olefin | Air | Acetic acid | | | |
| 0–12 | Isobutene | 120 | 60 | 60 | 180 | 4.14 | 5.1 |
| 12–40 | Propylene | 60 | 60 | 60 | 180 | 4.14 | 1.5 |
| 40–44 | Ethylene | 120 | 120 | 60 | 180 | 7.24 | 0.6 |

EXAMPLE 10

Catalyst for oligomerization and polymerization of butadiene (i) Preparation of silica-containing trivalent phosphorus groups (P-silica).—Silica (ex. J. Crosfield U40) was washed with dilute acid, Soxhlet-extracted with distilled water and then dried for four hours at 180° C. 55 g. of this silica were then refluxed with 53.2 g. of $(C_6H_5)_2PCH_2CH_2Si(OC_2H_5)_3$ in 400 ml. of mixed xylenes for eight hours in a flask under nitrogen. The ethanol produced was azeotroped from the reaction mixture using a Dean and Stark apparatus. The resulting phosphorus-containing silica was then washed with toluene in a Soxhlet apparatus for eight hours and subsequently with pentane for six hours. The silica was then dried in vacuo for eight hours.

Phosphorus content=0.9% wt.

(ii)(a) General procedure for catalyst preparation and testing in glass pressure vessels.—A Fischer and Porter glass aerosol compatibility tube (type 110–023) was used. The experiment was carried out under nitrogen with the rigorous exclusion of oxygen.

The glass pressure vessel was initially fitted with a rubber seal ("suba-seal") and purged with oxygen-free nitrogen by piercing the seal with hypodermic tubing connected to the nitrogen supply. Liquids were added to and removed from the glass pressure vessel under nitrogen using a system of hypodermic tubes and secondary vessels similarly fitted with rubber seals.

When the reaction mixture had been added to the pressure vessel, the rubber seal was removed and a metal screw-cap put in position as quickly as possible under a stream of nitrogen. The vessel was then pressurized and depressurized with nitrogen and the valve on the screw-cap closed. The vessel was then heated in an oil bath on a stirrer-hot plate. The reaction mixture was stirred using a magnetic stirrer.

(b) Polymerisation of butadiene.—1 g. of P-silica prepared as described in (i) above was washed with dry toluene saturated with butadiene in a glass pressure vessel fitted with a magnetic stirrer. 30 ml. of dry toluene saturated with butadiene were introduced together with 0.1 g. (Ni(COD)$_2$). The reaction mixture was stirred at room temperature for one hour and the solution then removed. The resulting nickel-containing polymer was washed with two 15 ml. aliquots of toluene saturated with butadiene. 30 ml. of toluene saturated with butadiene were then added with 1.0 ml. of diethyl aluminium ethoxide. The reaction vessel was closed and heated for 16 hours at 100° C. Results obtained are as follows:

Quantity of product=0.88 g. of cyclic dimer, 3.12 g. of polybutadiene
Activity=11 g. of cyclic dimer/g nickel/h The cyclic dimer fraction consisted of: 55% wt. vinyl cyclohexene, 45% wt. cyclo-octadiene.

Nickel content of silica=0.5% wt.

EXAMPLE 11

Alternative preparation of a phosphorus-containing silica 100 ml. of tetraethyl ortho silicate were poured in to 100 ml. of water containing 0.3 ml. concentrated HCl with stirring. 60 ml. of (2-diphenyl phosphine ethyl) triethoxysilane dissolved in 100 ml. of ethanol were then added. The reaction mixture was then stirred at 30° C. for 16 hours. The reaction mixture was then cooled to room temperature and an excess of aqueous ammonia added. The solid product was then isolated, washed with first methanol and then pentane in a Soxhlet apparatus and finally heat dried.

Phosphorus content=3.9% wt.

EXAMPLE 12

Catalyst preparation (a) The compound $(C_2H_3O)_3SiCH_2CH_2P(C_6H_5)_2$ (A) was prepared from triethoxy vinyl silane and diphenyl phosphine as described in Example 1.

(b)(i) 3.63 g. of compound (A) dissolved in 10 ml. of benzene were added to 0.79 g. of cyclo-octadiene rhodium (I) chloride [RhCl(C$_8$H$_{12}$)] in 20 ml. of benzene. The colour of the solution changed from light orange to bright red. The solution was left stirring at room temperature for 16 hours under nitrogen. The benzene was then evacuated off to yield a red viscous material. The complex was dissolved in pentane and then precipitated from solution by cooling. The supernatant solution was decanted off and the remaining viscous material, evacuated at 60° C. and 10$^{-4}$ mm. Hg for 14 hours to yield compound (B).

(ii) The reaction was repeated on a larger scale using 17.4 g. of compound (A), in 50 ml. of benzene and 3.8 g. of cyclo-octadiene rhodium (I) chloride in 100 ml. of benzene. (Yield 100%.)

Rhodium content of product=7.7% wt. (calculated rhodium content for

[RhCl((C$_2$H$_5$O)$_3$SiCH$_2$P(C$_6$H$_5$)$_2$)$_3$]=8.1% wt.)

(c)(i) 1.14 g. of compound (B) were dissolved in 30 ml. of benzene, and added to 5 g. of silica ("Sorbosil" U40 grade, acid-washed and dried before use). The reaction mixture was then refluxed and benzene containing ethanol azeotroped from the mixture using a Dean and Stark apparatus. After 3 hours, the reaction mixture was cooled, the benzene solution decanted off from the silica and the resulting dark red silica washed with benzene (3 × 30 ml.). The silica was then transferred under nitrogen to a Soxhlet apparatus and extracted with benzene for 10 hours (after which time the eluent was colourless). The silica was then dried in vacuo.

Rhodium content=0.9% wt.
Phosphorus content=0.8% wt.

(ii) The above reaction was repeated. 3.67 g. of compound (B) dissolved in 30 ml. of benzene were added to 20 g. of silica in 50 ml. of benzene. Ethanol in benzene was azeotroped from the reaction mixture over 2 hours. The resulting silica was treated as before.

Rhodium content=0.7% wt.
Phosphorus content=0.6% wt.
Chlorine content=0.3% wt.

EXAMPLE 13

Approximately 2 g. of the complex, prepared from $(C_2H_5O)_3SiCH_2CH_2P(C_6H_5)_2$ and cyclo-octadiene rhodium chloride ([RhCl(C$_8$H$_{12}$)], were dissolved in 25 ml. of benzene and added to 20 g. of alumina (pseudo-boehmite, 30–60 mesh B.S.S. granules, ex. Laporte) suspended in 50 ml. of benzene under oxygen-free nitrogen. The reaction mixture was then refluxed and stirred under nitrogen for 2 hours and the resulting ethanol azeotroped from the reaction mixture using a Dean and Stark apparatus. The resulting rhodium-containing alumina was then washed with benzene (2× 50 ml.) and then Soxhlet-extracted with benzene under nitrogen for four hours. Finally the product was dried in vacuo.

Rhodium content=0.6% wt.

We claim:

1. Catalyst support materials of the formula:

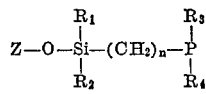

where Z is a residue obtained by removing an —OH from an inorganic material containing surface —OH groups selected from the group consisting of silica, alumina and zeolitic molecular sieves and where $R_1$ and $R_2$ are selected from the group consisting of aryl, alkyl, alkoxy and aryloxy groups containing up to 10 carbon atoms and halogen, $R_3$ and $R_4$ are selected from the group consisting of aryl and alkyl groups containing up to 10 carbon atoms, and $n$ is an integer from 1 to 6.

2. A catalyst comprising a catalyst support material as claimed in claim 1 wherein the phosphorus atom is bonded to the metal nucleus of a transition metal complex, said transition metal selected from the group consisting of rhodium, cobalt, iridium, palladium, nickel and rhenium wherein the ligands of said complex are selected from the group consisting of carbonyl, mono-olefins, diolefins, phosphines, tetrahydrofuran, chloro, cyclododecatriene, acetylacetonate, π-allyl, hydrogen, carboxylate, n-butylsulfide, and combinations thereof.

3. A process for the preparation of catalyst support materials as claimed in claim 1 which comprises reacting an inorganic material selected from the group consisting of silica, alumina and zeolitic molecular sieves containing surface —OH groups with a compound containing phosphorus and silicon of the formula:

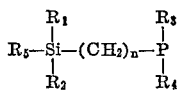

where $R_1$, $R_2$, $R_3$ and $R_4$ and $n$ are as defined in claim 1 and $R_5$ is selected from the group consisting of halogen, alkoxy and aryloxy, said alkoxy and aryloxy groups containing up to 10 carbon atoms and wherein the reaction is effected under reflux with the compound containing silicon and phosphorus dissolved in an inert solvent.

4. A process for the preparation of catalysts as claimed in claim 2 which comprises reacting a catalyst support material of the formula

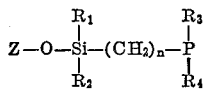

where Z is a residue obtained by removing an —OH group from an inorganic material containing surface —OH groups selected from the group consisting of silica, alumina, and zeolitic molecular sieves and where $R_1$ and $R_2$ are selected from the group consisting of aryl, alkyl, alkyloxy and aryloxy groups containing up to 10 carbon atoms and halogen, $R_3$ and $R_4$ are selected from the group consisting of aryl and alkyl groups containing up to 10 carbon atoms, and $n$ is an integer from 1 to 6 with a complex of a transition metal selected from the group consisting of rhodium, cobalt, iridium, palladium, nickel and rhenium wherein the ligands of said complex are selected from the group consisting of carbonyl, mono-olefins, diolefins, phosphines, tetrahydrofuran, chloro, cyclododecatriene, acetylacetonate, π-allyl, hydrogen, carboxylate, n-butylsulfide, and combinations thereof at a temperature in the range —80° C. to 250° C. resulting in bond formation between the transition metal nucleus and the phosphorus atom of the support.

5. A process for the preparation of catalysts as claimed in claim 2 which comprises first reacting a transition metal complex, said transition metal selected from the group consisting of rhodium, cobalt, iridium, palladium, nickel and rhenium wherein the ligands of said complex are selected from the group consisting of carbonyl, mono-olefins, diolefins, phosphines, tetrahydrofuran, chloro, cyclododecatriene, acetylacetonate, π-allyl, hydrogen, carboxylate, n-butylsulfide, and combinations thereof with a compound having both silicon and phosphorus of the formula:

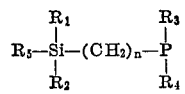

where $R_1$ and $R_2$ are selected from the group consisting of aryl, alkyl, alkyloxy and aryloxy groups containing up to 10 carbon atoms and halogen, $R_3$ and $R_4$ are selected from the group consisting of aryl and alkyl groups containing up to 10 carbon atoms, and $n$ is an integer from 1 to 6, and $R_5$ is selected from the group consisting of halogen, alkoxy and aryloxy, said alkoxy and aryloxy groups containing up to 10 carbon atoms at a temperature of —80° C. to 250° C. to form a product containing the transition metal nucleus bonded to phosphorus and then reacting this product in solution at a temperature of 10° C. to 250° C. under reflux with an inorganic material of formula Z—OH where Z is a residue obtained by removing an —OH group from an inorganic material containing surface —OH groups selected from the group consisting of silica, alumina and zeolitic molecular sieves.

References Cited

UNITED STATES PATENTS

| | | | |
|---|---|---|---|
| 3,213,156 | 10/1965 | Harding et al. | 252—430 U X |
| 3,280,096 | 10/1966 | MacKenzie | 252—430 X |
| 3,288,725 | 11/1966 | Aftandilian | 252—430 X |
| 3,389,092 | 6/1968 | Sanford et al. | 252—430 |

PATRICK P. GARVIN, Primary Examiner

U.S. Cl. X.R.

252—426, 431 C; 260—448 R, 448, 448.2 N